(12) United States Patent
Clark

(10) Patent No.: US 7,279,245 B1
(45) Date of Patent: Oct. 9, 2007

(54) SYSTEM FOR REMOVAL OF INERTS FROM FUEL CELL REACTANTS

(75) Inventor: David L. Clark, Highlands Ranch, CO (US)

(73) Assignee: Lockheed Martin Corporation, Bethesda, MD (US)

(*) Notice: Subject to any disclaimer, the term of this patent is extended or adjusted under 35 U.S.C. 154(b) by 729 days.

(21) Appl. No.: 10/731,698

(22) Filed: Dec. 9, 2003

Related U.S. Application Data (60) Provisional application No. 60/431,925, filed on Dec. 9, 2002.

(51) Int. Cl.
*H01M 2/00* (2006.01)
*H01M 2/14* (2006.01)

(52) U.S. Cl. ............................ 429/34; 429/38; 429/39

(58) Field of Classification Search ................. 429/34, 429/38, 39
See application file for complete search history.

(56) References Cited

U.S. PATENT DOCUMENTS

| | | | |
|---|---|---|---|
| 3,615,842 A | 10/1971 | Craft ............................ 136/86 |
| 4,950,371 A | 8/1990 | McElroy ....................... 204/129 |
| 5,122,239 A | 6/1992 | McElroy et al. ............... 204/101 |
| 5,454,923 A | 10/1995 | Nachlas et al. ............... 204/270 |
| 5,837,393 A * | 11/1998 | Okamoto ....................... 429/20 |
| 6,068,673 A | 5/2000 | Bloomfield .................... 48/197 |
| 6,242,120 B1 | 6/2001 | Herron .......................... 429/22 |
| 6,348,278 B1 * | 2/2002 | LaPierre et al. ............... 429/17 |
| 6,432,565 B1 * | 8/2002 | Haines .......................... 429/17 |
| 6,436,563 B1 | 8/2002 | Frank et al. ................... 429/17 |
| 6,579,638 B2 | 6/2003 | Brassard ....................... 429/21 |
| 6,610,193 B2 | 8/2003 | Schmitman ................... 205/628 |
| 2002/0051898 A1 | 5/2002 | Moulthrop, Jr. et al. ...... 429/17 |
| 2003/0143449 A1 * | 7/2003 | Hunik ........................... 429/34 |

OTHER PUBLICATIONS

"The Compression of Hydrogen in an Electrochemical Cell Based on a PE Fuel Cell Design" by R. Strobel et al., Journal of Power Sources105 ( 2002) pp. 208-215.

* cited by examiner

*Primary Examiner*—Dah-Wei Yuan
(74) *Attorney, Agent, or Firm*—Marsh Fischmann & Breyfogle LLP (57) ABSTRACT

An electrical power plant that includes a fuel cell and at least one recycle system for recycling at least a first reactant, for reuse by the fuel cell. The fuel cell discharges a first exit stream that includes the first reactant and inerts. The recycle system comprises a separator that receives the first exit stream from the fuel cell and separates the first reactant contained in the first exit stream from inerts contained in the exit stream. The separated first reactant is directed back to the fuel cell for reuse. The remaining inerts and unseparated first reactant are discharged by the separator and then recirculated back into the separator, without progressing through the fuel cell, to separate additional first reactant from the inerts.

18 Claims, 7 Drawing Sheets

Prior Art

SYSTEM FOR REMOVAL OF INERTS FROM FUEL CELL REACTANTS

RELATED APPLICATIONS

This application claims priority under 35 U.S.C. §119(e) from U.S. Provisional Patent Application No. 60/431,925, that was filed on Dec. 9, 2002, that is entitled "INERT REMOVAL SYSTEM FOR PEM FUEL CELLS," and the entire disclosure of which is hereby incorporated by reference in its entirety herein.

FIELD OF THE INVENTION

The present invention generally relates to fuel cells and, more particularly, to a system for removal of inert gases from one or more fuel cell reactants.

BACKGROUND OF THE INVENTION

Fuel cells are devices that convert chemical reactants, namely an oxidant/oxidizer and a fuel, into electricity. Recent advances in fuel cell technology have increased their efficiency and lowered their cost, which has allowed fuel cells to compete with other more conventional types of energy conversion devices such as combustion engines and batteries. The variety in the types and sizes of fuel cells makes them versatile for use in a variety of applications, including providing electrical power for laptop computers, powering vehicles, and even providing electrical power for homes.

Figure 1:
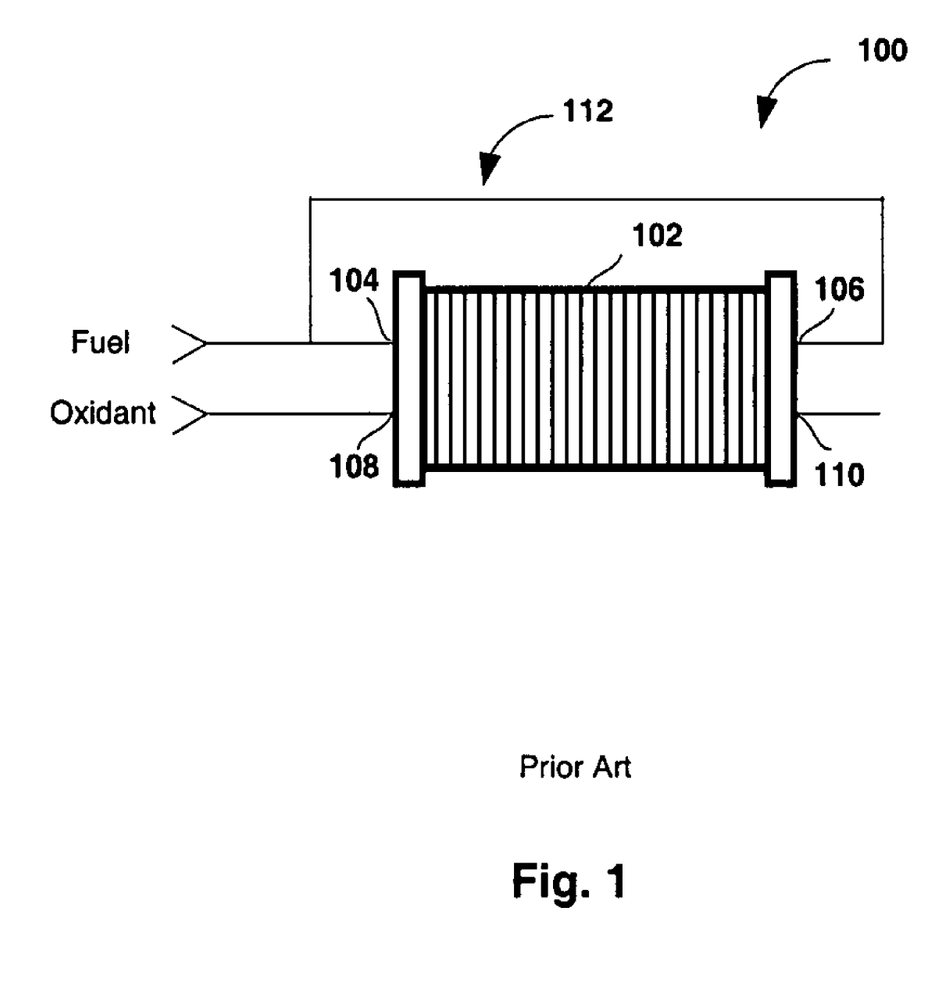
FIG. 1 shows a schematic of a conventional (prior art) electrical power generator utilizing a fuel cell and including a reactant recycle system for the fuel.

FIG. 1 illustrates a typical electrical power generator 100 that utilizes a fuel cell 102 to generate electricity. Electrical power generator 100 includes recycle system 112 for a fuel. Fuel cell 102 has a fuel inlet 104 for input of fuel into fuel cell 102 from a fuel source. Any fuel not consumed by fuel cell 102 for the generation of electricity exits fuel cell 102 through fuel outlet 106. Fuel recycle system 112 recirculates unconsumed fuel from fuel outlet 106 back to fuel inlet 104.

Fuel cell 102 also has an oxidant inlet 108 for input of oxidant into fuel cell 102 from an oxidant source. The oxidant will chemically react within the fuel cell with the fuel to produce electricity and a reactant product. The reactant product generated by the reaction of the oxidant and the fuel will exit fuel cell 102 through oxidant outlet 110. The reactant product may be discharged for disposal.

One type of fuel cell that has garnered a significant amount of research and interest is the polymer electrolyte membrane (PEM) fuel cell. The PEM fuel cell operates by supplying hydrogen to an anode, where a catalyst, typically a platinum-containing catalyst, separates the hydrogen into electrons and protons. The electrons that are separated from the hydrogen are transported to a cathode via an external circuit, which can be used to provide electrical power for a desired application/electrical load (electric motor, communication systems, propulsion systems, etc.). The protons are transported from the anode to the cathode through a solid electrolyte, namely a polymer electrolyte membrane (PEM). The PEM is a solid polymer and is typically made from a proton conductive fluoropolymer.

Oxygen is supplied to the cathode of the PEM fuel cell as pure oxygen or oxygen diluted with other gases. For example, the oxygen can be supplied to the cathode in the form of ambient air. At the cathode, the protons and electrons, aided by a catalyst, combine with the oxygen to produce water as a reactant product.

One problem encountered by some PEM fuel cells is a build up of inert gases (inerts) on the anode side of the fuel cell. The inerts diffuse into the fuel cell from the ambient environment because of the low partial pressure of nitrogen and other inerts present in the fuel cell system. Additionally, if the oxygen feed into the cathode contains inerts, for example if air is used, then the inerts in the oxygen feed will eventually diffuse from the cathode to the anode side of the fuel cell. The build up of inerts on the anode side of the fuel cell has the effect of displacing the hydrogen. The displacing of the hydrogen by the inerts keeps the hydrogen from contacting the catalyst and generating electrons and protons. When the inerts reach a high enough concentration, very little, if any, hydrogen contacts the catalyst and the fuel cell stops producing electricity.

Conventionally, the inerts problem is handled by periodic venting/purging of the anode side of the fuel cell. The venting/purging removes the inerts from the anode, thereby allowing the hydrogen access to the catalyst. However, when the anode side of the fuel cell is purged, valuable hydrogen is also purged. The amount of hydrogen purged with the inerts can be at least somewhat controlled to limit the amount of lost hydrogen by timing the purge cycle to efficiently remove the inerts. Even with efficient purging of the anode, however, a significant portion of the hydrogen is lost to purging of the inerts.

Depending on the application of the fuel cell, losing 10 percent of the hydrogen on every purge may be tolerable. For example, in automotive applications, losing 10 percent of the hydrogen on every purge is not a significant issue because the vehicles must be periodically re-fueled anyway. In closed loop systems such as space systems and the like, efficiencies are of major importance and losing 10 percent of the hydrogen each purge is not acceptable.

Thus, there is a need for an improved way of dealing with inerts in hydrogen fuel cells, particularly closed looped systems, that reduces or eliminates the purging of valuable hydrogen.

BRIEF SUMMARY OF THE INVENTION

A first aspect of the present invention is embodied by an electrical power plant that generally includes a fuel cell and a first reactant recycle system. The fuel cell includes a first reactant inlet (e.g., an inlet for a first reactant) and a first outlet (e.g., for a first discharge out of the fuel cell). The first reactant recycle system is fluidly interconnectable with the first outlet of the fuel cell. "Fluidly interconnectable" herein means that the relevant components may be in constant fluid communication or may be selectively placed in fluid communication (e.g., by operation of a valve). In any case, the first reactant recycle system includes a separator. This separator in turn includes a separator inlet, a first separator outlet, and a second separator outlet. The separator inlet is fluidly interconnectable with the first outlet of the fuel cell, the first separator outlet is fluidly interconnectable with the first reactant inlet of the fuel cell, and the second separator outlet is fluidly interconnectable with the separator inlet without having to progress back through the fuel cell. The second separator outlet may be viewed as a fuel cell bypass for redirecting a flow back into the separator.

Various refinements exist of the features noted in relation to the first aspect of the present invention. Further features may also be incorporated in the first aspect of the present invention as well. These refinements and additional features may exist individually or in any combination. The fuel cell may be of any appropriate configuration and may use any appropriate reactant or combination of multiple reactants. In one embodiment, the fuel cell is in the form of a polymer electrolyte membrane fuel cell. The first reactant inlet thereby may be associated with a single fuel cell or with a plurality of fuel cells, and may be of any appropriate configuration. Similarly, the first reactant recycle system may receive a discharge from a single fuel cell, from multiple fuel cells (e.g., a fuel cell stack) or multiple fuel cell stacks. The first outlet thereby may be associated with a single cell or with a plurality of fuel cells.

A flow or discharge from the first outlet of the fuel cell to the first reactant recycle system may be controlled in the case of the first aspect. For instance, a valve may be disposed in-line with a conduit extending between the first outlet of the fuel cell and the first reactant recycle system. Similarly, a flow or discharge from the separator of the first reactant recycle system, through the second separator outlet back to the separator inlet (that again bypasses the fuel cell), may be controlled as well. The flow or discharge from the separator through its second separator outlet may be selectively directed to one of multiple flowpaths. For instance, the flow or discharge from the separator through the second separator outlet may be directed through a conduit to a three-way valve. One of the outlet ports to this valve may direct a flow or discharge back to the separator inlet in a manner that bypasses the fuel cell. Another of the outlet ports to this valve may direct a flow or discharge to an appropriate source (e.g., a storage vessel; outside the electrical power plant; a second reactant inlet that may be associated with the fuel cell, and that will be discussed in more detail below).

The first separator inlet associated with the first aspect may be in any appropriate form, including without limitation in the form of a single port, in the form of individual multiple ports, or in the form of a common manifold associated with multiple inlet conduits to the separator. The second separator outlet may be fluidly interconnectable with the separator inlet in any appropriate manner. For instance, a conduit may extend from the second separator outlet to a conduit that extends from the first outlet of the fuel cell to the separator inlet. Another option would be for a conduit to extend from the second separator outlet directly to the separator inlet (e.g., one conduit could extend from the first outlet of the fuel cell to one port of the separator inlet, and another conduit could extend from the second separator outlet to another port of the separator inlet).

The first reactant inlet for the fuel cell used by the first aspect may be in any appropriate form, including without limitation in the form of a single port, in the form of individual multiple ports, or in the form of a common manifold associated with multiple first reactant inlet conduits to the fuel cell. The first separator outlet may be fluidly interconnectable with the first reactant inlet of the fuel cell in any appropriate manner. For instance, a conduit may extend from the first separator outlet to a conduit that extends from a first reactant storage vessel or source to the first reactant inlet of the fuel cell. Another option would be for a conduit to extend from the first separator outlet directly to the first reactant inlet of the fuel cell (e.g., one conduit could extend from the first separator outlet into one port of the first reactant inlet, and another conduit could extend from a first reactant storage vessel or source to another port of the separator inlet). Yet another option would be for a conduit to extend from the first separator outlet to a first reactant storage vessel or source that is fluidly interconnectable with the first reactant inlet of the fuel cell.

The separator used by the electrical power plant of the first aspect may be of any appropriate configuration. In one embodiment, this separator includes an anode and a cathode that are separated by a solid electrolyte. Any appropriate solid electrolyte may be utilized, including without limitation a polymer, a fluoropolymer, a ceramic, or a metal oxide. Typically the solid electrolyte will be tailored to the type of the first reactant that is to be recovered from the flow out of the first outlet of the fuel cell for re-direction to the first reactant inlet.

The electrical power plant of the first aspect may be characterized as including a first flowpath (e.g., created by a conduit) from the first outlet of the fuel cell to the separator inlet, a second flowpath (e.g., created by a conduit) from the first separator outlet to the first reactant inlet of the fuel cell, and a third flowpath (e.g., created by a conduit) from the second separator outlet back to the separator inlet that bypasses the fuel cell. The first reactant recycle system may include an accumulator that is associated with the first flowpath such that the accumulator is disposed between the first outlet of the fuel cell and the separator. The third flowpath (associated with the second separator outlet) may merge with the first flowpath (associated with the separator inlet) at a location that is between the accumulator and the separator, or at a location between the accumulator and the first outlet of the fuel cell. Another option would be for the first and third flowpaths each to individually connect with the separator inlet. In any case, an appropriate valve or the like may be associated with the third flowpath to control the flow from the second separator outlet back to the separator inlet in a manner that bypasses the fuel cell. An appropriate pump or other fluid displacement device also may be associated with the third flowpath to provide a flow from the second separator outlet back to the separator inlet in a manner that bypasses the fuel cell.

The fuel cell utilized by the first aspect may include a second reactant inlet and a second outlet. A first reactant source (e.g., a fuel, such as hydrogen) may be fluidly interconnectable with the first reactant inlet, while a second reactant source (e.g., an oxidant/oxidizer, such as air, pure oxygen, or a combination thereof) may be fluidly interconnectable with the second reactant inlet. A second reactant recycle system may be associated with the second outlet of the fuel cell for recovering a second reactant for re-use in the fuel cell. In one embodiment, this second reactant recycle system uses an anode and a cathode that are separated by a solid electrolyte. Another embodiment utilizes multiple recovery chambers or vessels for the second reactant recycle system.

A second aspect of the present invention is embodied by an electrical power plant that includes a fuel cell, a first reactant recycle system, a first flowpath, a second flowpath, and a third flowpath. The fuel cell includes a first reactant inlet and a first outlet. The first reactant recycle system includes a separator that in turn includes a separator inlet, a first separator outlet, and a second separator outlet. The first flowpath extends from the first outlet of the fuel cell to the separator inlet. The second flowpath extends from the first separator outlet to the first reactant inlet of the fuel cell. The third flowpath extends from the second separator outlet to the separator inlet, bypassing the fuel cell.

Various refinements exist of the features noted in relation to the second aspect of the present invention. Further features may also be incorporated in the second aspect of the present invention as well. These refinements and additional features may exist individually or in any combination. The various features discussed above in relation to the first aspect may be used by this second aspect, individually or in any appropriate combination.

A third aspect of the present invention is embodiment by a method for generating electrical power. A first reactant feed is provided to a fuel cell for the production of electrical power. A first exit stream from the fuel cell is directed to a separator. At least a portion of the first reactant in the first exit stream is separated from the remainder to define a first separated reactant stream. This first separated reactant stream is directed out of the separator. A portion of the first exit stream from the fuel cell is recycled/recirculated through the separator without having to pass back through the fuel cell to continually allow the first reactant to be recovered from the first exit stream.

Various refinements exist of the features noted in relation to the third aspect of the present invention. Further features may also be incorporated in the third aspect of the present invention as well. These refinements and additional features may exist individually or in any combination. The first reactant feed may be a fuel (e.g., hydrogen) or an oxidant/oxidizer (e.g., oxygen, and including pure oxygen, air, or a combination thereof). In the case where the first reactant is in the form of hydrogen, the separator may utilize an anode, a cathode, and an intermediate solid electrolyte that transports hydrogen ions from the anode to the cathode. In the case where the first reactant is in the form of oxygen, the separator may utilize an anode, a cathode, and an intermediate solid electrolyte that transports oxygen ions from the cathode to the anode.

Both inerts and first reactant will typically be contained in the first exit stream from the fuel cell in the case of the third aspect. Preferably a substantial portion of the first reactant is recovered from this first exit stream out of the fuel cell, at least ultimately for reuse by the fuel cell for generating electrical power. The first separated reactant stream containing the recovered first reactant may be directed to an appropriate first reactant storage vessel or source that is fluidly interconnectable with the fuel cell, or may be directed immediately back to the fuel cell for use in the generation of electrical power. Remaining portions of the first exit stream are re-processed to enhance the amount of first reactant that is recovered. Preferably, substantially little to no first reactant remains in the first exit stream after processing in accordance with the third aspect has been terminated.

Recycling of the first exit stream from the fuel cell through the separator in accordance with the third aspect may be initiated after terminating the discharge of the first exit stream from the fuel cell. That is, "first exit stream" encompasses a volume of fluid that has been discharged from the fuel cell, and is not limited to a continual flow from the fuel cell. This volume of fluid is processed to preferably maximize the recovery of first reactant therefrom. Once the desired amount of recovery of first reactant has been realized, the remaining, now preferably first reactant depleted fluid may be directed out of the separator. One option would be to discharge the first reactant depleted fluid to the environment. Another option would be to discharge the first reactant depleted fluid to an appropriate storage vessel. Yet another option would be to discharge the first reactant depleted fluid into a second reactant inlet that may be associated with the fuel cell.

The fuel cell used in relation to the third aspect may direct a second reactant (e.g., oxidizer) into the fuel cell for use in the generation of electrical power. A second exit stream containing second reactant may be directed out of the fuel cell. At least part of the second reactant in this second exit stream may be recovered by using an appropriate solid electrolyte membrane disposed between an anode and cathode. Another option for recovering at least part of the second reactant from the second exit stream would be to use at least two different recovery chambers/vessels. Yet another option is for the second reactant to be recovered using at least two different recovery chambers/vessels and by using an appropriate solid electrolyte membrane disposed between an anode and cathode.

A fourth aspect of the present invention is embodied by an electrical power plant that includes a fuel cell, a first reactant recycle system, and a second reactant recycle system. The fuel cell includes a first and second reactant inlets, as well as first and second outlets. The first reactant recycle system is fluidly interconnectable with the first outlet of the fuel cell, while the second reactant recycle system is fluidly interconnectable with the second outlet of the fuel cell. The first reactant recycle system includes a separator in the form of a cathode and an anode separated by a solid first electrolyte, and functions to recover a first reactant for reuse by the electrical power plant. The second reactant recycle system may be in one of two forms, but in any case functions to recover a second reactant for reuse by the electrical power plant. One option is for the second reactant recycle system to be in the form of a cathode and an anode separated by a solid second electrolyte. Another option is for the second reactant recycle system to utilize multiple recovery chambers or vessels. Yet another option is for the second reactant recycle system to utilize at least two different recovery chambers/vessels and utilize an appropriate solid electrolyte membrane disposed between an anode and cathode.

Various refinements exist of the features noted in relation to the fourth aspect of the present invention. Further features may also be incorporated in the fourth aspect of the present invention as well. These refinements and additional features may exist individually or in any combination. The various features discussed above in relation to the first aspect may be used by this fourth aspect, individually or in any appropriate combination.

DETAILED DESCRIPTION OF THE INVENTION

The present invention will now be described in relation to the accompanying drawings, which at least assist in illustrating its various pertinent features.

Figure 2A:
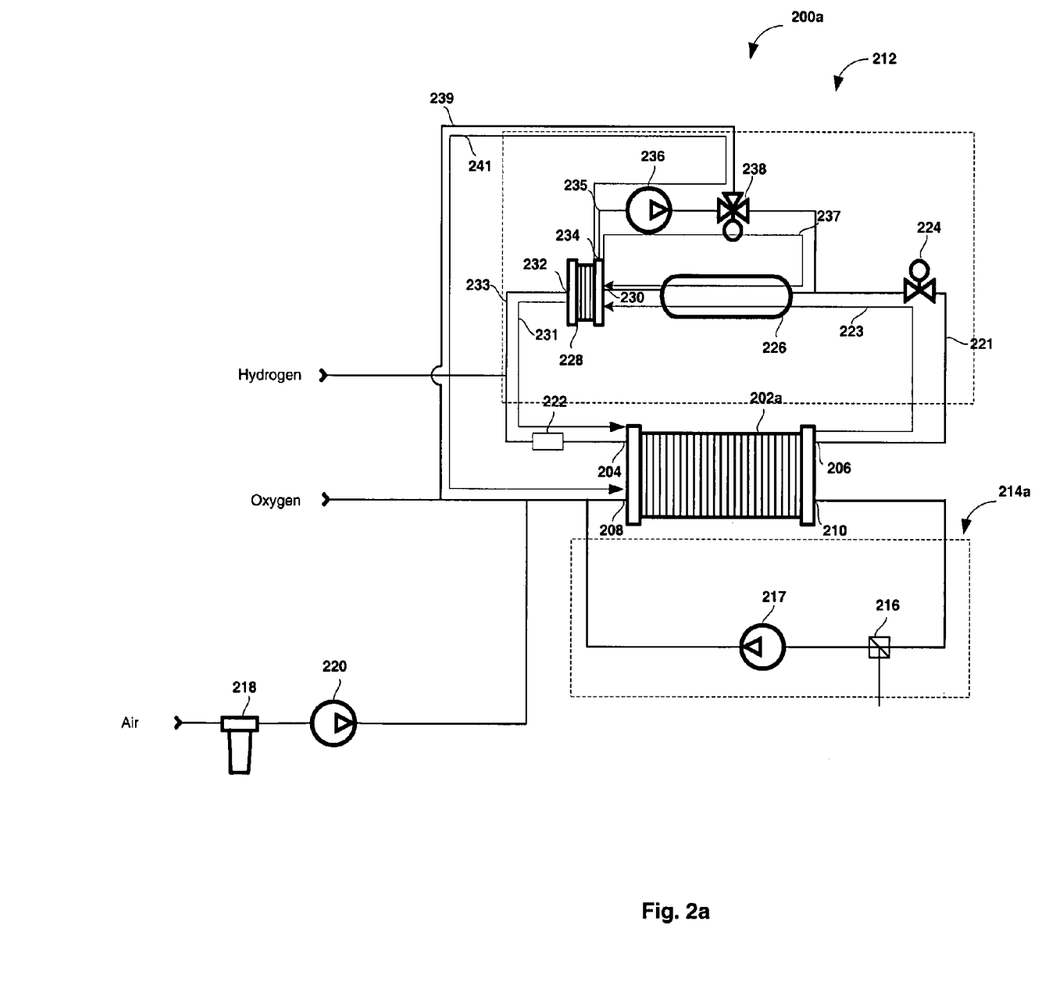
FIGS. 2a and 2b show schematics of electrical power generators using two different embodiments of reactant recycle systems.

FIG. 2a shows a schematic of one embodiment of an electrical power generator and that is identified by reference numeral 200a. Electrical power generator 200a includes a fuel cell 202a that operates to produce electrical power by reacting hydrogen and oxygen. The term "fuel cell" is intended to include a singe fuel cell and/or a plurality of fuel cells in a fuel cell stack. The oxygen supplied to fuel cell 202a may be diluted with inert gases (inerts). By "inerts," it is meant gases that are not used by the fuel cell 202a to produce electricity, but only dilute one or more of the reactants (oxygen and hydrogen). It should be noted that in other embodiments, fuel cell 202a may operate on pure oxygen. The oxygen supplied to fuel cell 202a may be supplied by air, pure oxygen or a combination of air and pure oxygen as shown in FIG. 2a. Oxygen entering fuel cell 202a is first diluted with air in the illustrated embodiment. The air may be supplied from the ambient environment and is directed through a filter 218 and displaced by pump 220 to be combined with the oxygen. The diluted oxygen enters fuel cell 202a through oxygen inlet 208, where it reacts with hydrogen to generate electricity and form water as a reactant product. The water reactant product exits fuel cell 202a, along with excess oxygen not consumed in the reaction and inerts from the air, through oxygen outlet 210.

Oxygen recycle system 214a recycles the oxygen and inerts exiting through oxygen outlet 210 back to oxygen inlet 208 for reuse by fuel cell 202a. Oxygen recycle system 214a includes reactant product recovery system 216 that separates the water reactant product from the oxygen and inerts, with the separated oxygen and inerts being displaced by pump 217 back to oxygen inlet 208. The water reactant product can be discharged or reused if electrical power generator 200a is part of a closed loop/regenerative system.

Electrical power generator 200a includes a humidifier 222 that humidifies hydrogen before the hydrogen enters fuel cell 202a. Hydrogen enters fuel cell 202a through hydrogen inlet 204. Excess hydrogen not consumed during operation of fuel cell 202a exits fuel cell 202a through hydrogen outlet 206. Any inerts that have diffused to the anode side from the cathode side will also exit fuel cell 202a through hydrogen outlet 206. Hydrogen recycle system 212 recycles hydrogen from hydrogen outlet 206 to hydrogen inlet 204 for reuse in fuel cell 202a.

Hydrogen recycle system 212 includes a conduit 221 that extends from hydrogen outlet 206 to separator inlet 230. An accumulator 226 (e.g., a tank, baffles or an inflatable balloon) is located along conduit 221. Accumulator 226 is fluidly interconnectable with hydrogen outlet 206 and is operable to accumulate hydrogen and inerts that exit fuel cell 202a through hydrogen outlet 206. A valve 224, also located along conduit 221, is operable to fluidly isolate accumulator 226 from hydrogen outlet 206, whenever desired. Hydrogen recycle system 212 also includes a separator 228 that separates hydrogen from inerts. Separator 228 has a first inlet 230 that is fluidly interconnectable with accumulator 226. Separator 228 receives a feed of hydrogen and inerts from accumulator 226 through first separator inlet 230. Thus, there is a flowpath as indicated by reference numeral 223 from hydrogen outlet 206 to first inlet 230 that is created by conduit 221 and accumulator 226. The hydrogen that is separated from the inerts by separator 228 exits separator 228 through a first separator outlet 232, which is fluidly interconnectable with the hydrogen inlet 204, through a conduit 233. A flowpath indicated by reference numeral 231, from first separator outlet 232 to hydrogen inlet 204, is created by conduit 233. The inerts and any remaining hydrogen that has not been separated by separator 228 exit separator 228 through a second separator outlet 234. A conduit 235 extends from separator outlet 234 and is fluidly interconnectable with conduit 221. The second separator outlet 234 is fluidly interconnectable with the accumulator 226 by conduit 235 (without progressing through fuel cell 202a) or with the oxygen inlet 208, by conduit 239 depending upon the configuration of a three-way valve 238. The inerts and remaining hydrogen may be pumped out of separator 228 and back into accumulator 226 by pump 236 with valve 238 in one configuration. The inerts and remaining hydrogen pumped out of separator 228 will combine with hydrogen and inerts accumulating in accumulator 226 from fuel cell 202a. Thus, there is a flowpath indicated by reference numeral 237 from separator outlet 234 to separator inlet 230, created by conduit 235, pump 236, conduit 221 and accumulator 226. In another configuration, valve 238 is operable to fluidly isolate second outlet 234 from fluid accumulator 226, and to thereby direct a flow through conduit 239 to oxygen inlet 208 and into fuel cell 202a. Therefore, a flowpath indicated by reference numeral 241 from separator outlet 234 to oxygen inlet 208 is created by conduit 235, pump 236 and conduit 239.

Hydrogen recycle system 212 can be operated in two different modes. In a first mode, valve 224 is operated to allow fluid communication between the hydrogen outlet 206 and accumulator 226, and valve 238 is operated to allow fluid communication between second outlet 234 and accumulator 226 (without progressing through fuel cell 202a). A hydrogen feed enters fuel cell 202a through hydrogen inlet 204. Some hydrogen will be consumed by fuel cell 202a to produce electricity. Unconsumed hydrogen will exit fuel cell 202a through hydrogen outlet 206, along with any inerts that have diffused to the anode side of the fuel cell. The hydrogen and inerts exiting through hydrogen outlet 206 will accumulate in accumulator 226. Hydrogen and inerts from accumulator 226 are then directed to separator 228 through separator inlet 230. Separator 228 will separate at least a portion of the hydrogen from the inerts, and recycle the separated portion of hydrogen back to the hydrogen inlet 204 through a first separator outlet 232. The inerts and remaining hydrogen that was not separated out by separator 228 are pumped out of separator 228 and back to accumulator 226 (without having to pass back through fuel cell 202a), by pump 236 (there is no fluid flow through conduit 239 to oxygen inlet 208 at this time). The hydrogen and inerts pumped out of separator 228 will combine with hydrogen and inerts being accumulated from fuel cell 202a. The hydrogen and inerts will be continually recirculated from accumulator 226 to separator 228 and again to accumulator 226. Because separator 228 removes hydrogen from the recirculating fluid of hydrogen and inerts, the concentration of inerts in the recirculating fluid will increase over time. The recirculation of hydrogen and inerts will typically continue until the inerts in accumulator 226 reach a predetermined concentration. Any way of determining when to change the operational mode of the hydrogen recycle system 212 may be utilized.

When the inerts in accumulator 226 reach a predetermined concentration or otherwise when a determination is made to change operational modes, the hydrogen recycle system 212 may be operated in a second mode of operation. In the second mode of operation, valve 224 is then operated so that accumulator 226 is fluidly isolated from hydrogen outlet 206 and does not accumulate any additional hydrogen and inerts from fuel cell 202a. The hydrogen and inerts are circulated from accumulator 226 to separator 228, where hydrogen is separated and directed to fuel cell 202a through hydrogen inlet 204, with the unseparated hydrogen and inerts being pumped by pump 236 back to accumulator 226 (without first passing through fuel cell 202a, and thereby bypassing fuel cell 202a), as described above. However, since accumulator 226 is not accumulating additional hydrogen from fuel cell 202a, the fluid recirculating from accumulator 226 to separator 228 and back to accumulator 226 is being depleted of hydrogen. The recirculation in this fashion may continue until a desired portion of the hydrogen has been separated from the inerts. Preferably, substantially all of the hydrogen is separated from the inerts (e.g., hydrogen remains in only parts per thousand and preferably only in parts per million). When substantially no hydrogen remains in the fluid or otherwise when a determination has been made that hydrogen recovery operations may be terminated, valve 238 is operated to create fluid isolation between pump 236 and accumulator 226 and to create fluid communication between pump 236 and oxygen inlet 208. The inerts are then pumped out of separator 238 and accumulator 226 and directed to oxygen inlet 208, where they may be advantageously used to dilute the oxygen entering fuel cell 202a.

After removal of the inerts from the separator 228 and accumulator 226, valve 238 is operated to again fluidly isolate pump 236 from oxygen inlet 208 and allow fluid communication between pump 236 and accumulator 226.

It should be noted that fuel cell 202a is operable to produce electricity when fuel recycle system 212 is operating in either the first mode or the second mode described above. Alternatively, fuel cell 202a may be stopped from producing electricity when system 212 is operating in either the first mode or the second mode described above.

As described above, the electrical power generator 200a illustrated in FIG. 2a has the advantage of removing inerts from the hydrogen, preferably without any significant loss of the valuable hydrogen. Additionally, in the electrical power generator 200a, the inerts are reused for diluting the oxygen before entering fuel cell 202a. The ability to conserve reactants and recycle the inerts for reuse makes the electrical power generator 200a particularly suitable for use in closed loop/regenerative power plants.

Figure 2B:
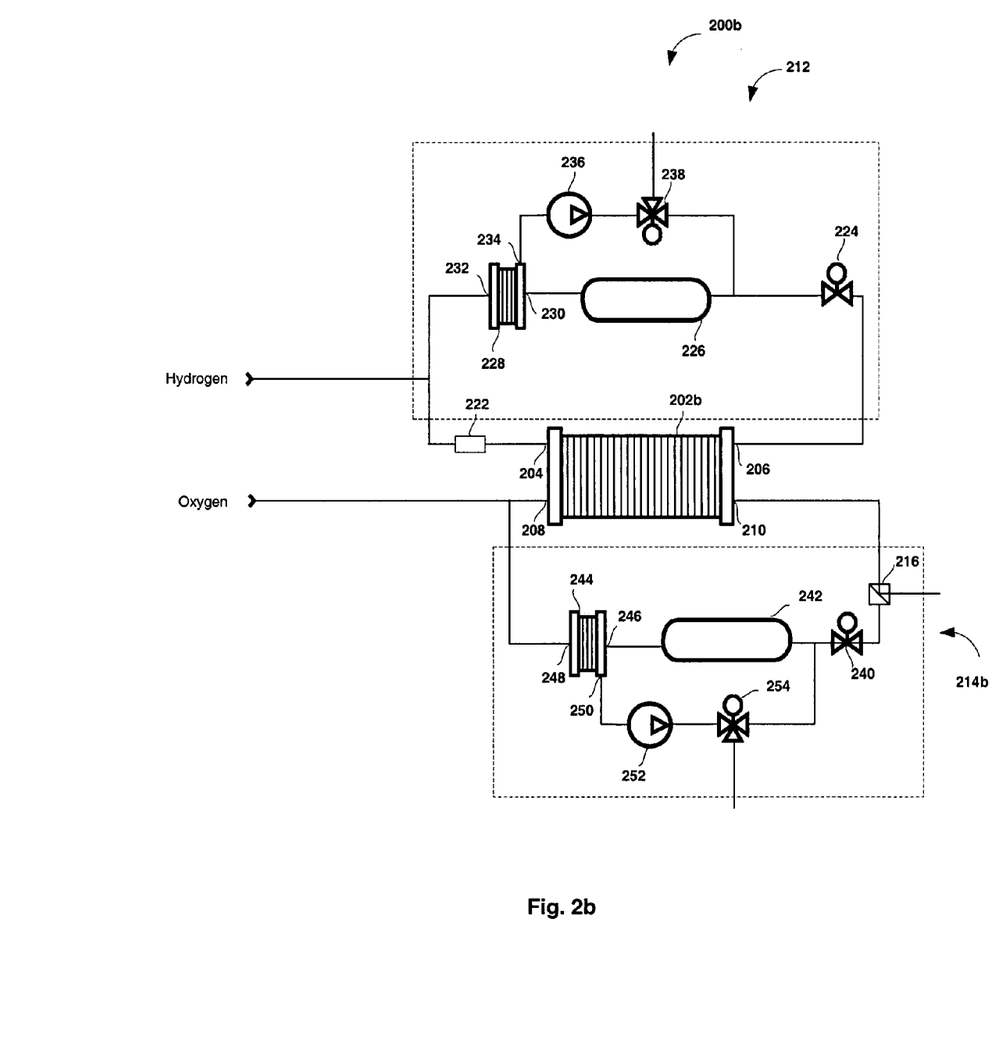

FIG. 2b is a schematic of a second embodiment of an electrical power generator and that is identified by reference numeral 200b. Corresponding parts from FIG. 2a are numbered the same in FIG. 2b. Electrical power generator 200b includes a fuel cell 202b that operates to produce electricity by reacting hydrogen and oxygen. In this embodiment, fuel cell 202b operates on pure oxygen. Electrical power generator 200b further includes the hydrogen recycle system 212 previously described with respect to FIG. 2a. However, because fuel cell 202b operates on pure oxygen, the inerts removed by recycle system 212 are not recycled to oxygen inlet 208. Rather, as shown in FIG. 2b, the inerts may be vented out to the ambient environment or directed to any appropriate storage vessel.

Electrical power generator 200b also has an oxygen recycle system 214b, which recycles the oxygen not consumed in the fuel cell 202b from oxygen outlet 210 back to oxygen inlet 208 for reuse by fuel cell 202b. Oxygen recycle system 214b includes reactant product recovery system 216 previously described above. Because fuel cell 202b operates on pure oxygen, any inerts that have entered electrical power generator 200b and combined with the excess oxygen exiting oxygen outlet 210 may be removed prior to recycling unconsumed oxygen from oxygen outlet 210 to oxygen inlet 208. Consequently, oxygen recycle system 214b further includes a system similar to hydrogen recycle system 212, described with respect to FIG. 2a, for separating oxygen from inerts.

Oxygen recycle system 214b includes an accumulator 242 (e.g. a tank, baffles or an inflatable balloon). Accumulator 242 is fluidly interconnectable with oxygen outlet 210 and is operable to accumulate oxygen and inerts that exit fuel cell 202b through oxygen outlet 210. A valve 240 is operable to fluidly isolate accumulator 242 from oxygen outlet 210, whenever desired. Oxygen recycle system 214b also includes a separator 244 that separates oxygen from inerts. Separator 244 has a first inlet 246 that is fluidly interconnectable with accumulator 242. Separator 244 receives a feed of oxygen and inerts from accumulator 242 through first separator inlet 246. The oxygen that is separated from the inerts by separator 244 exits separator 244 through a first separator outlet 248, which is fluidly interconnectable with the oxygen inlet 208. The inerts and any remaining oxygen that has not been separated by separator 244 exit separator 244 through a second separator outlet 250. The second separator outlet 250 is fluidly interconnectable with the accumulator 242 without having to pass back through the fuel cell 202b. The inerts and remaining oxygen are pumped out of separator 244 and back into accumulator 242 by pump 252. The inerts and remaining oxygen pumped out of separator 244 will combine with oxygen and inerts accumulating in accumulator 242 from fuel cell 202b. A valve 254 is operable to fluidly isolate second outlet 250 from fluid accumulator 242.

Similar to hydrogen recycle system 212, oxygen recycle system 214b can be operated in two different modes. In a first mode, valve 240 is operated to allow fluid communication between the oxygen outlet 210 and accumulator 242, and valve 254 is also operated to allow fluid communication between second outlet 250 and accumulator 242 (bypassing the fuel cell 202b). An oxygen feed enters fuel cell 202b through oxygen inlet 208. Some oxygen will be consumed by fuel cell 202b to produce electricity. Unconsumed oxygen will exit fuel cell 202b through oxygen outlet 210, along with any inerts that may have diffused into the fuel cell 202b and the water reactant product. The oxygen, inerts and water exiting through oxygen outlet 210 will enter reactant product recovery system 216, where the water will be separated out from the oxygen and inerts. The oxygen and inerts exiting product recovery system 216 will accumulate in accumulator 242. Oxygen and inerts from accumulator 242 are then directed to separator 244 through separator inlet 246. Separator 244 will separate at least a portion of the oxygen from the inerts, and recycle the separated portion of oxygen back to the oxygen inlet 208 through a first separator outlet 248. The inerts and remaining oxygen that was not separated out by separator 244 are pumped out of separator 244 and back to accumulator 242 by pump 252 (again, bypassing the fuel cell 202b). The oxygen and inerts pumped out of separator 244 combine with oxygen and inerts being accumulated from reactant product recovery system 216. The oxygen and inerts will be continually recirculated from accumulator 242 to separator 244 and again to accumulator 242. Because separator 244 removes oxygen from the recirculating fluid of oxygen and inerts, the concentration of inerts in accumulator 242 will increase over time. The recirculation of oxygen and inerts will typically continue until the inerts in accumulator 242 reach a predetermined concentration. Any way of determining when to change the operational mode of the oxygen recycle system 214b may be utilized.

When the inerts in accumulator 242 reach a predetermined concentration or otherwise when a determination is made to change operational modes, the oxygen recycle system 214b may be operated in a second mode of operation. In the second mode of operation, valve 240 is then operated so that accumulator 242 is fluidly isolated from oxygen outlet 210 and does not accumulate any additional oxygen and inerts from reactant product recovery system 216. The oxygen and inerts are recirculated from accumulator 242 to separator 244, where oxygen is separated and directed to fuel cell 202b, with the unseparated oxygen and inerts being displaced by pump 252 back to accumulator 242, as described above. However, since accumulator 242 is not accumulating additional oxygen from reactant product recovery system 216, the fluid recirculating from accumulator 242 to separator 244 and back to accumulator 242 is continually being depleted of oxygen. The recirculation of oxygen and inerts preferably continues until substantially all of the oxygen has been separated from the inerts or otherwise when a determination has been made that oxygen recovery operations may be terminated. When substantially no oxygen remains in the fluid or otherwise when a determination has been made that oxygen recovery operations may be terminated, valve 254 is operated to create fluid isolation between pump 252 and accumulator 242 and to create fluid communication between pump 236 and the ambient environment or an appropriate storage vessel. The inerts are then displaced out of separator 244 and accumulator 242 to the ambient environment or an appropriate storage vessel by pump 252. After removal of the inerts from the separator 244 and accumulator 242, valve 254 is operated to again allow fluid communication between pump 252 and accumulator 242.

In electrical power generator 200b, hydrogen recycle system 212 and oxygen recycle system 214b may both operate in their first mode of operation when fuel cell 202b is operated to produce electricity, and hydrogen recycle system 212 and oxygen recycle system 214b may both operate in their second mode of operation when fuel cell 202b is not operating to produce electricity. However, each could operate in any mode without regard to operation of the other and without regard to whether fuel cell 202b is operating to produce electricity.

Figure 3:
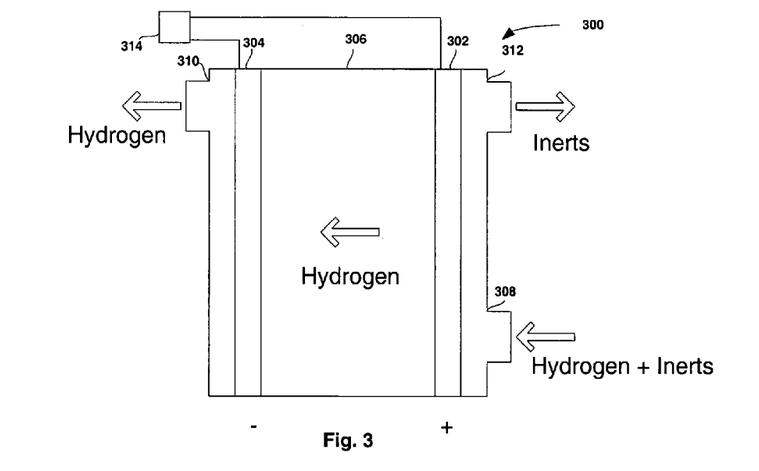
FIGS. 3 and 4 show illustrations of two different separators that may be used by the reactant recycle systems of FIGS. 2a and 2b, respectively.
Figure 4:
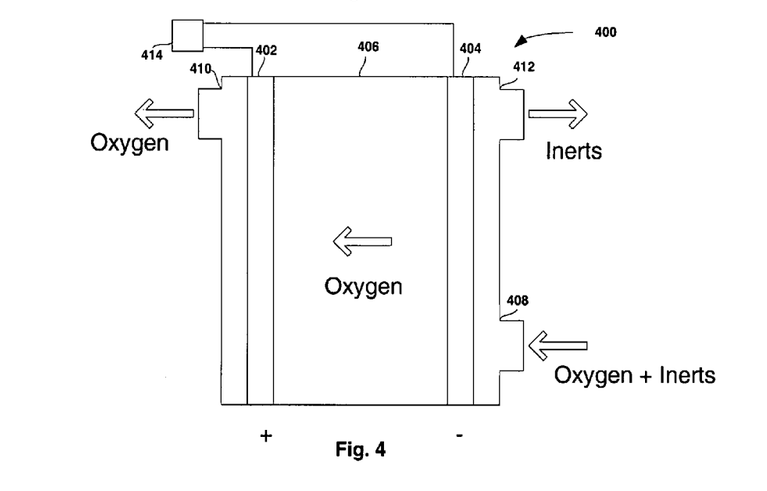

The separators (i.e. 228 and 244) described in FIGS. 2a and 2b for separating the reactants (oxygen and hydrogen) from inerts can be any suitable device that selectively separates the desired reactant from inerts. FIGS. 3 and 4 illustrate examples of two possible separators that may be used by the hydrogen recycle system 212 and the oxygen recycle system 214b, respectively.

FIG. 3 illustrates one embodiment of a separator that may be used by the hydrogen recycle system 212 and that is identified by reference numeral 300. Separator 300 includes an anode 302, a cathode 304 and a solid electrolyte 306. Solid electrolyte 306 is made of a material that is capable of selectively transporting hydrogen from anode 302 to cathode 304, such as for example a fluoropolymer used in PEM fuel cells. Additionally, separator 300 comprises an inlet 308 for intake of hydrogen and inerts, a first outlet 310 for exit of the hydrogen that is separated from the inerts, and a second outlet 312 for exit of the inerts as well as hydrogen that does not pass through the solid electrolyte 306 toward cathode 304. A secondary power source 314 is used to apply a potential between anode 302 and cathode 304.

Separator 300 operates by receiving a feed of hydrogen and inerts through inlet 308. The hydrogen and inerts contact anode 302. The surface of anode 302 has a catalyst, similar to catalysts used in PEM fuel cells, that separates the hydrogen into protons and electrons. An electric potential (i.e. a voltage) is applied by secondary power source 314 between anode 302 and cathode 304. The potential applied between anode 302 and cathode 304 can be as large as about 1.2 volts or as small as about 25 millivolts, but is preferably in a range from about 1.1 volts to about 40 millivolts, such as from about 1 volt to about 50 millivolts. With the applied potential, the protons are transported from the anode 302 across the solid electrolyte 306 and recombine with electrons at cathode 304 to reform hydrogen, which exits separator 300 through outlet 310. The inerts remain on anode 302 and exit through outlet 312. Hydrogen that does not pass through solid electrolyte 306 in the direction of cathode 304 also exits through outlet 312.

FIG. 4 illustrates one embodiment of a separator that may be used in the oxygen recycle system 214b and that is identified by reference numeral 400. Separator 400 comprises an anode 402, a cathode 404 and a solid electrolyte 406. Solid electrolyte 406 is made of a material that is capable of selectively transporting oxygen from cathode 404 to anode 402, such as for example metal oxides used in solid oxide fuel cells. Any appropriate metal oxide may be used as solid electrolyte 406, for example yttria-stabilised zirconia, gadolinium doped ceria, hafnia or bismuth oxide. Additionally, separator 400 comprises an inlet 408 for intake of oxygen and inerts, a first outlet 410 for exit of the oxygen that is separated from the inerts, and a second outlet 412 for exit of the inerts as well as any remaining oxygen that does not pass through the solid electrolyte 406 toward anode 402. A secondary power source 414 is used to apply a potential between cathode 404 and anode 402.

Separator 400 operates by receiving a feed of oxygen and inerts through inlet 408. The oxygen and inerts contact cathode 404. An electric potential (i.e. a voltage) is applied by secondary power source 414 between cathode 404 and anode 402. The potential applied between cathode 404 and anode 402 can be as large as about 1 volt or as small as about 25 millivolts, but is preferably in a range from about 0.75 volts to about 40 millivolts, such as from about 0.5 volts to about 50 millivolts. Similar to a solid oxide fuel cell, the oxygen at cathode 404 is reduced to negatively charged oxygen ions. With the applied potential, the oxygen ions are transported from cathode 404 across solid electrolyte 406 and combine at anode 402 to reform oxygen, which exits separator 400 through outlet 410. The inerts remain on cathode side 404 and exit through outlet 412. Oxygen that does not pass through the solid electrolyte 406 in the direction of anode 402 also exits through outlet 412.

It should be noted, that recycle systems 212 and 214b may utilize a single separator 300 or 400, or may utilize a plurality of separators 300 and 400. Separators 300 and 400 are merely illustrative examples of possible separators that may be used by the hydrogen recycle system 212 and the oxygen recycle system 214b. As stated above, any suitable device that selectively separates the desired reactant from inerts may be used.

Figure 5:
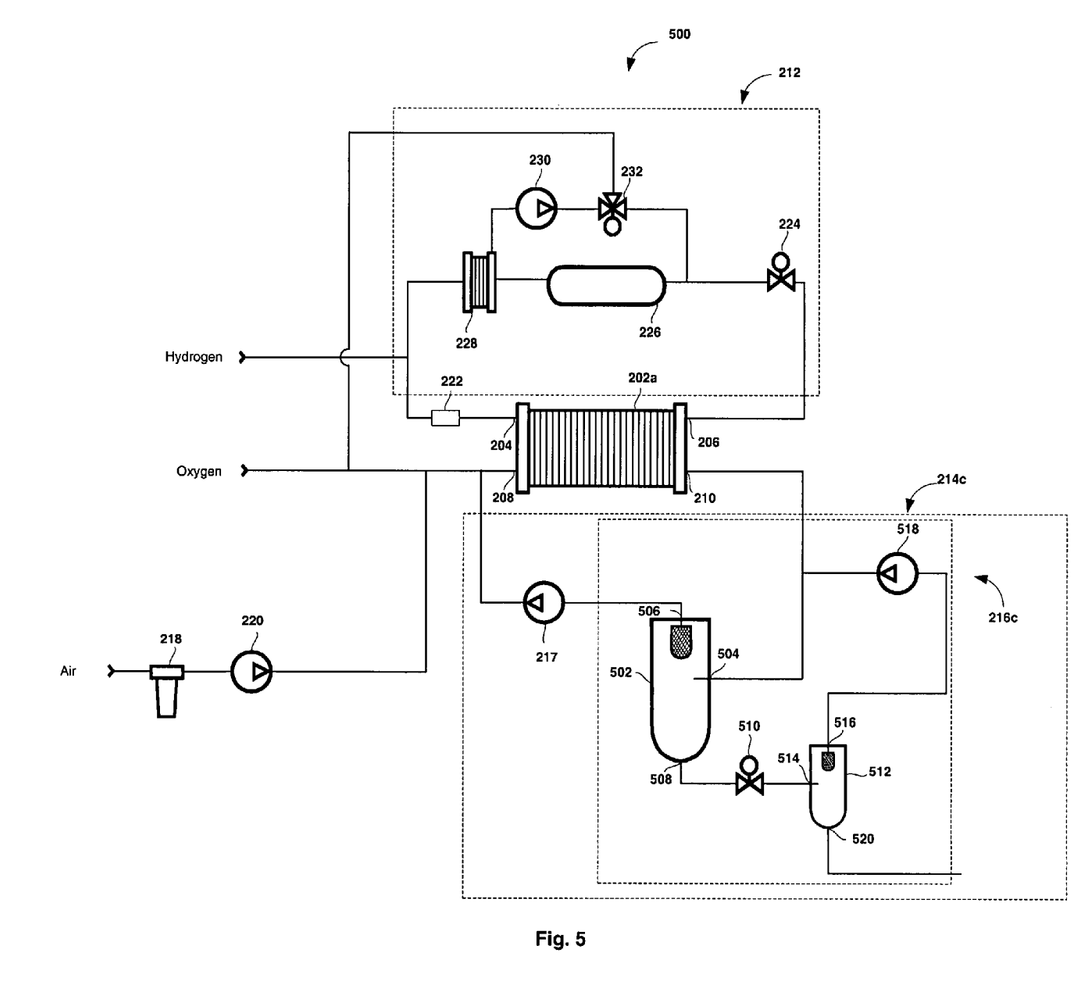
FIG. 5 shows a schematic of another embodiment of an electrical power generator that includes a reactant product recovery system.

Referring now to FIG. 5, FIG. 5 shows a schematic of another embodiment of an electrical power generator that is identified by reference numeral 500. Electrical power generator 500 is similar to electrical power generator 200a in FIG. 2a. Corresponding parts from FIG. 2a are numbered the same in FIG. 5. Electrical power generator 500 includes fuel cell 202a that operates to produce electricity by reacting hydrogen and oxygen. Fuel cell 202a operates as described above. Electrical power generator 500 also includes hydrogen recycle system 212 that is operable as described above with respect to FIG. 2a. Hydrogen recycle system 212 separates hydrogen from inerts, recycles the separated hydrogen to hydrogen inlet 204 and directs the inerts to oxygen inlet 208 to dilute the oxygen provided to fuel cell 202a for production of electricity.

Electrical power generator 500 further includes oxygen recycle system 214c, which recycles oxygen and inerts from oxygen outlet 210 back to oxygen inlet 208 for reuse by fuel cell 202a. Oxygen recycle system 214c operates similarly to previously described oxygen recycle system 214a. Oxygen recycle system 214c includes reactant product recovery system 216c that separates the water reactant product from the oxygen and the inerts. The separated oxygen and inerts are displaced by pump 217 back to oxygen inlet 208.

In this embodiment, reactant product recovery system 216c includes a primary recovery chamber 502. Primary recovery chamber 502 has a primary inlet 504 for oxygen, inerts and water reactant product that exit fuel cell 202a. Primary recovery chamber 502 separates the oxygen and inerts from the water reactant product. The oxygen and inerts exit primary recovery chamber 502 through primary gas outlet 506 and are pumped back to oxygen inlet 208 by pump 217. The water reactant product exits primary recovery chamber 502 through primary liquid outlet 508. Reactant recovery system 216c also includes second recovery chamber 512. Second product recovery chamber 512 includes a secondary inlet 514 that is fluidly interconnectable with primary liquid outlet 508. A valve 510 is operable to control the fluid communication between primary liquid outlet 508 and secondary inlet 514. Secondary recovery chamber 512 will separate any remaining oxygen and inerts from the water reactant product. The oxygen and inerts exit secondary recovery chamber 512 through secondary gas outlet 516 and are displaced by pump 518 to be combined with oxygen, inerts and water reactant product exiting fuel cell 202a and entering primary recovery chamber 502, or alternatively the oxygen and inerts exiting secondary recovery chamber 512 can be directly displaced to oxygen inlet 208. The water reactant product exits secondary recovery chamber 512 through secondary liquid outlet 520. The water reactant product is discharged for disposal, or recycled if electrical power generator 500 is part of a closed loop/regenerative system.

Reactant product recovery system 216c is operable to recover as much oxygen and inerts as possible from the mixture of oxygen, inerts and water reactant product exiting fuel cell 202a. Primary recovery chamber 502 will typically recover a majority of the oxygen and inerts from the water reactant product. However, the pressure inside primary recovery chamber 502 is high enough that some oxygen and inerts will remain dissolved in the water reactant product. Consequently, if the water reactant product is discharged from primary recovery chamber 502, electrical power generator 500 will lose valuable oxygen reactant. Secondary recovery chamber 512 allows the additional oxygen and inerts to be recovered before the water reactant product is discharged. Preferably, secondary recovery chamber 512 will be at a lower pressure than primary recovery chamber 502, so that when the water reactant product enters secondary recovery chamber 512, the drop in pressure will reduce the solubility of the oxygen and inerts in the water reactant product. The reduction in solubility will cause additional oxygen and inerts to separate from the water reactant product and be recovered.

The combination of primary recovery chamber 502 and secondary recovery chamber 512 provide the advantage of recovering more oxygen and inerts from the water reactant product before the water reactant product is discharged. In a closed loop/regenerative power plant, the conservation of reactants is of paramount importance, and the embodiment illustrated in FIG. 5, which combines hydrogen recycle system 212 and reactant product recovery system 216c, is ideally suited for use in a closed loop/regenerative system.

Figure 6:
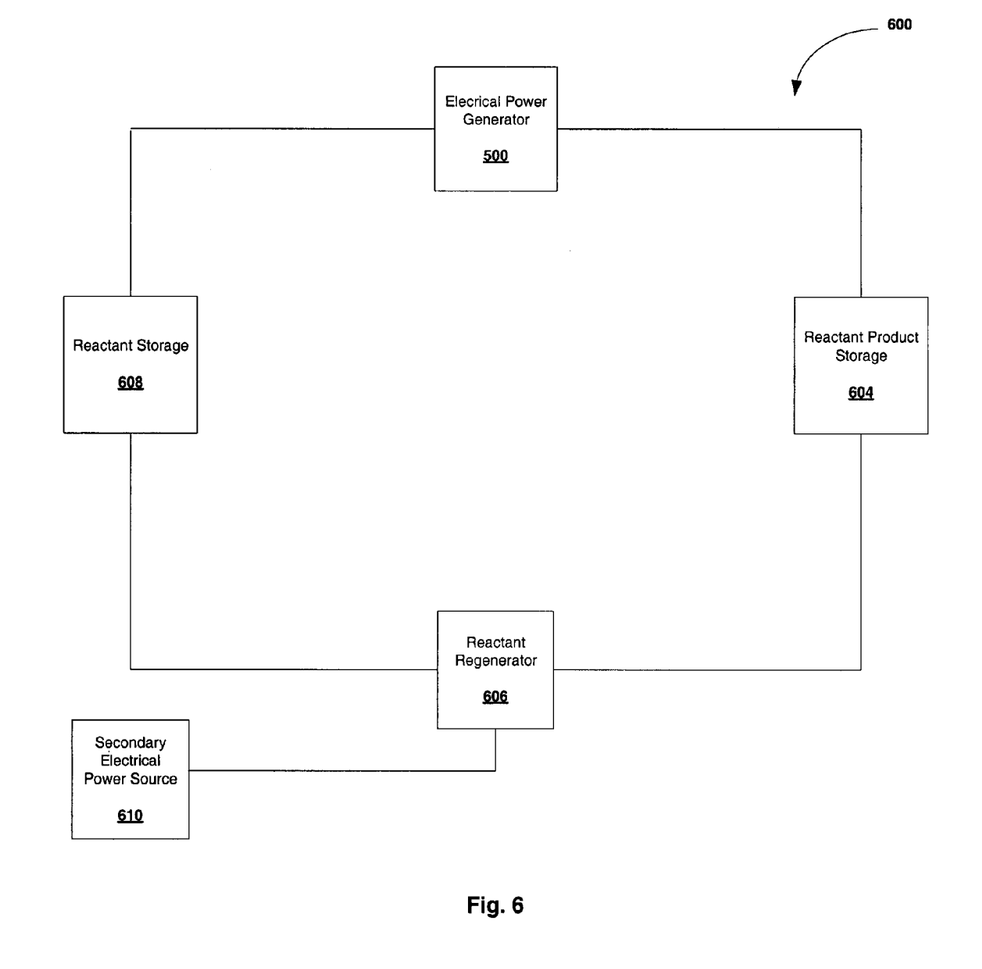
FIG. 6 shows a flow diagram of one embodiment of a regenerative fuel cell system.

FIG. 6 shows a flow diagram of a closed loop/regenerative electrical power plant 600. The electrical power plant 600 includes electrical power generator 500 from FIG. 5, reactant product storage 604, reactant regenerator 606, reactant storage 608 and secondary electrical power source 610. The electrical power plant 600 is operable in at least two different modes, an electrical power generation mode and a reactant regeneration mode. The electrical power plant 600 may be operated in both of these modes simultaneously, but preferably the electrical power plant 600 is operated in only one of these modes at any given time.

When the electrical power plant 600 is operated in the electrical power generation mode, electrical power generator 500 is operated to generate electricity from oxygen and hydrogen supplied from reactant storage 608. Water reactant product produced by electrical power generator 500 is recovered and stored in reactant product storage 604. During the electrical power generation mode, oxygen and hydrogen are consumed in electrical power generator 500, producing the water reactant product.

When the electrical power plant 600 is operated in the reactant regeneration mode, the reactant regenerator 606 is operated to produce the oxygen and hydrogen from the water reactant product supplied from reactant product storage 604. Oxygen and hydrogen produced by reactant regenerator 606 are then recovered and stored in reactant storage 608. Power to operate the reactant regenerator 606 during the regeneration mode is supplied from secondary electrical power source 610. The secondary electrical power source 610 may include any device capable of generating electrical power, for example a photovoltaic electrical power generator, such as one or more arrays of solar cells (also referred to as photovoltaic cells) or a wind electrical power generator. Secondary power source 610 may also be used to power other devices in electrical power plant 600, such as for example separator 228 in electrical power generator 500. During the regeneration mode, water reactant product is consumed in reactant regenerator 606, producing the oxygen and hydrogen to replenish reactant storage 608, ready for the next cycle of operation in the electrical power generation mode.

Figure 7:
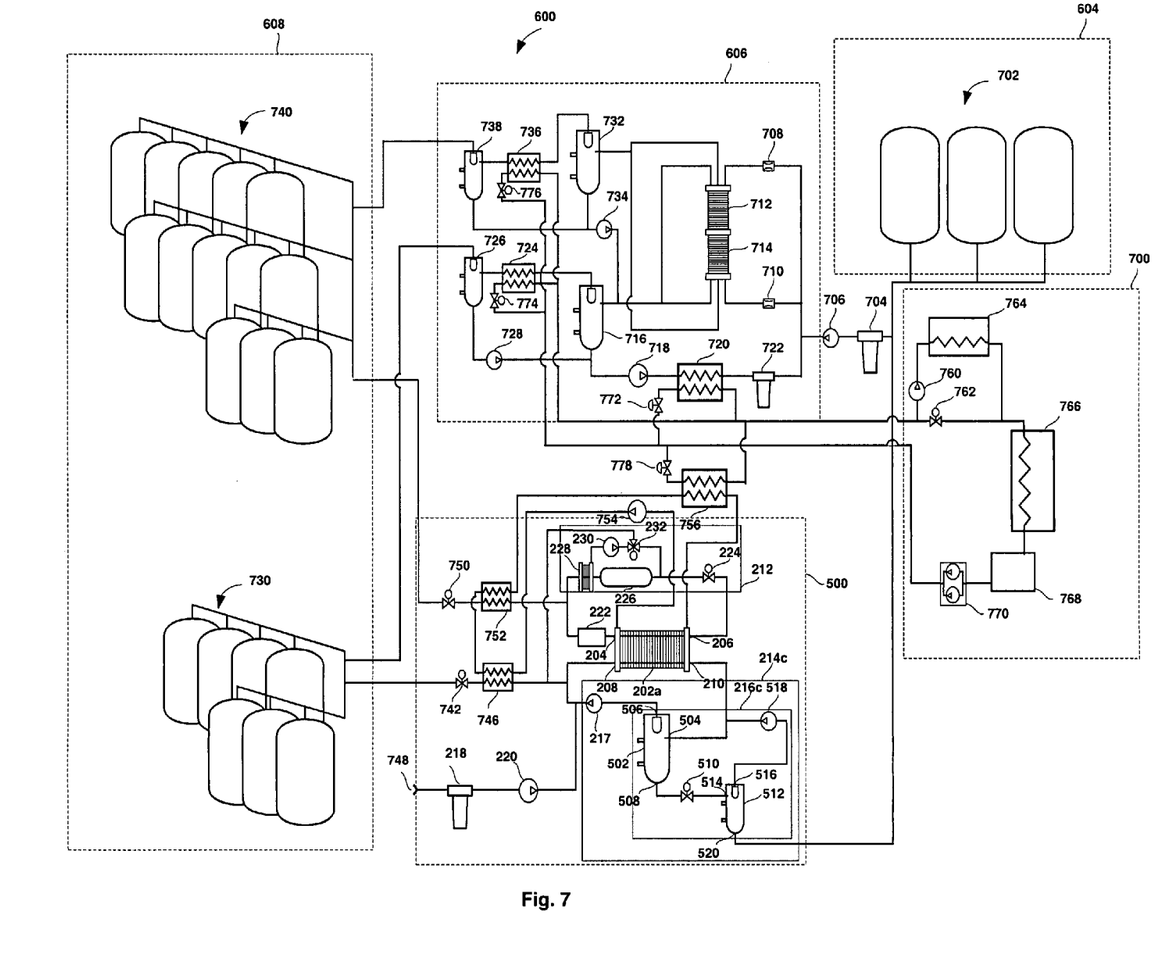
FIG. 7 shows a more detailed schematic of a regenerative fuel cell system in accordance with the embodiment of FIG. 6.

FIG. 7 is a more detailed schematic of a specific embodiment of the closed loop/regenerative electrical power plant 600 of FIG. 6. Electrical power plant 600 includes the fuel cell electrical power generator 500 of FIG. 5. The electrical power generator 500 operates as previously described above. Corresponding parts from FIGS. 5 and 6 are marked with the same part numbers on FIG. 7.

Electrical power plant 600 has electrical power generator 500 from FIG. 5, reactant product storage 604, reactant regenerator 606 and reactant storage 608. Reactant product storage 604 includes water storage tanks 702 for storing the water reactant product produced by electrical power generator 500. When power plant 600 is operated in the electrical power generation mode, water from water storage tanks 702 is directed to a deionizer 704, which removes ions from the water before the water is used by reactant regenerator 606 to make oxygen and hydrogen. A pump 706 directs water from deionizer 704 to reactant regenerator 606.

Reactant regenerator 606 includes electrolyzers 712 and 714 that regenerate oxygen and hydrogen from the water supplied by reactant storage 604. The amount of water entering electrolyzers 712 and 714 is controlled by flow limiters 708 and 710 respectively. The oxygen produced by electrolyzers 712 and 714 is directed to a water separator 716, for separation of any water from the oxygen. The water separated in water separator 716 is displaced by pump 718 to heat exchanger 720 to remove heat from the water. A deionizer 722 removes ions from the water before the water is directed back to electrolyzers 712 and 714 to produce additional oxygen and hydrogen. The oxygen in separator 716 is directed to heat exchanger 724 to remove heat from the oxygen. The oxygen is then directed to another water separator 726 to remove any remaining water from the oxygen. The water removed from the oxygen in water separator 726 is displaced by pump 728 and is combined with water exiting water separator 716. The water is recycled to electrolyzers 712 and 714 as described above. The oxygen from water separator 726 is then directed to reactant storage 608, where it is stored in oxygen storage tanks 730.

The hydrogen produced by electrolyzers 712 and 714 is directed to a water separator 732 to separate water that may have exited electrolyzers 712 and 714 with the hydrogen. Water separated in water separator 732 is displaced by pump 734 into water separator 716, where it combines with the water in water separator 716 and is recycled to the electrolyzers 712 and 714. The hydrogen from water separator 732 is directed to heat exchanger 736 where heat is removed from the hydrogen. The hydrogen then enters another water separator 738 to remove additional water that may be associated with the hydrogen. The water removed in separator 738 is combined with the water removed from water separator 732 and is recycled to the electrolyzers 712 and 714. The hydrogen from water separator 738 is then directed to reactant storage 608, where it is stored in hydrogen storage tanks 740.

Oxygen and hydrogen stored in reactant storage 608 are utilized by electrical power generator 500 to produce electricity. Valve 750 is operable to control fluid communication between hydrogen storage tanks 740 and hydrogen inlet 204. Valve 742 is operable to control fluid communication between oxygen storage tanks 730 and oxygen inlet 208. When electrical power plant 600 is operating in electrical power generation mode, oxygen is directed from oxygen storage tanks 730 to heat exchanger 746, which cools the oxygen before it enters into fuel cell 202a. The oxygen is diluted with air or inerts recycled from hydrogen recycle system 212 before entering fuel cell 202a. The air is supplied by the ambient environment and enters electrical power plant 600 through air inlet 748. In other embodiments, the air could be supplied from air storage tanks or as stated previously, fuel cell 202a could be operated on pure oxygen. The diluted oxygen enters fuel cell 202a through oxygen inlet 208. The oxygen reacts with the hydrogen in fuel cell 202a to generate electricity and form the water reactant product. The oxygen not consumed during the reaction to produce electricity exits through oxygen outlet 210 and is recycled by oxygen recycle system 214c as previously described with respect to FIG. 5. The water reactant product, substantially free of oxygen and inerts, exits secondary recovery chamber 512 through secondary liquid outlet 520 and is directed to reactant storage 604, where it is stored in water storage tanks 702.

When electrical power plant 600 is operating in electrical power generation mode, hydrogen is directed from hydrogen storage tanks 740 to heat exchanger 752, which cools the hydrogen before it enters into fuel cell 202a. The hydrogen is then directed to humidifier 222, which humidifies the hydrogen before it enters fuel cell 202a. The humidified hydrogen enters fuel cell 202a through hydrogen inlet 204. The hydrogen reacts with the oxygen in fuel cell 202a to generate electricity and form the water reactant product. The hydrogen not consumed during the reaction to produce electricity exits through hydrogen outlet 206 and is recycled by hydrogen recycle system 212, which operates as previously described with respect to FIG. 2a.

As previously stated with respect to FIG. 6, electrical power plant 600 may be operated in electrical power generation mode and reactant regeneration mode simultaneously, but preferably the electrical power plant is operated in only one of these modes at any given time.

Additionally, electrical power plant 600 includes heat exchanger 756 and pump 754. Pump 754 transfers a heat transfer fluid through fuel cell 202a and heat exchangers 746, 752 and 756. The heat transfer fluid is circulated through the heat exchangers (746, 752 and 756) and is used to cool fuel cell 202a and the reactants (oxygen and hydrogen) before the reactants enter fuel cell 202a.

Electrical power plant 600 also includes a heat management system 700 that is thermally interconnectable to heat exchangers 756, 724, 736 and 720. Valves 778, 774, 776 and 772 control the flow of a heat transfer fluid through heat exchangers 756, 724, 736 and 720 and consequently control the thermal communication of the heat exchangers (756, 724, 736 and 720) with heat management system 700. The heat management system 700 includes a reservoir 768 for storing the heat transfer fluid, pumps 770, pump 760, valve 762, heat exchanger 764 and heat exchanger 766. Pumps 770 are operable to transfer the heat transfer fluid in reservoir 768 to heat exchangers 756, 724, 736 and 720. After the heat transfer fluid has circulated through heat exchangers 756, 724, 736 and 720, it circulates through heat exchangers 764 and/or 766, where any heat previously transferred to the heat transfer liquid from heat exchangers 756, 724, 736 and 720 is dissipated to the environment. Pump 760 is operable to create a flow of heat transfer fluid into heat exchanger 764. Valve 762 is operable to control whether the heat transfer fluid progresses through heat exchanger 764 before passing through heat exchanger 766, or whether a portion of the heat transfer fluid passes directly to heat exchanger 766. After heat is dissipated to the environment via heat exchangers 764 and 766, the heat transfer fluid is directed back to reservoir 768 for storage and eventual circulation back to heat exchangers 756, 724, 736 and 720.

The electrical power plant 600 may be used in any application that utilizes electrical power. For example, power plant 600 may be a part of a mobile vehicle such as an automobile, a sea vessel or an airship. Electrical power plant 600 could provide the necessary power for the vehicle's propulsion system, an electric motor, the vehicle's communication system or all of the foregoing. In other applications, electrical power plant 600 could provide electrical power for use in stationary terrestrial applications such as to power homes, office buildings or stationary communication systems. The electrical power plant 600 could be used to provide power to any electrical load.

The foregoing discussion of the invention has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Moreover, any of the features of any embodiment may be combined in any compatible manner with any feature(s) of any other embodiment. For example, any of the features described with respect to any of the embodiments for the electrical power generator described with respect to any of FIGS. 2a, 2b, and 5 may be incorporated into any closed loop/regenerative electrical power plant described with respect to FIGS. 6-7. Also, any feature or operation of any portion of the electrical power plant described with respect to any of FIGS. 2a, 2b and 5-7 may be incorporated in any combination into the method of the invention for generating electrical power.

Additionally, flowpaths, created by the features/components illustrated in the figures, are not limited to those features/components that are illustrated in the figures. In other embodiments, the flowpaths may be created using conduits or other features/components not shown in the figures.

The terms "comprise", "include", "have" and "contain", and variations of those terms, as may be used in relation to the presence of a feature, are intended to indicate only that a particular feature is present, and are not intended to limit the presence of other features.

What is claimed is:

1. An electrical power plant, comprising:
   a fuel cell comprising a first reactant inlet and a first outlet; and
   a first reactant recycle system comprising a separator, said separator comprising a separator inlet, wherein said first outlet of said fuel cell is fluidly interconnectable with said separator inlet, wherein said separator further comprises a first separator outlet fluidly interconnectable with said first reactant inlet of said fuel cell and a second separator outlet fluidly interconnectable with said separator inlet, wherein a flow out of said separator through said second separator outlet returns to said separator inlet without progressing through said fuel cell.

2. The electrical power plant of claim 1, wherein said fuel cell is a polymer electrolyte membrane fuel cell.

3. The electrical power plant of claim 1, further comprising means for selectively preventing fluid communication from said first outlet of said fuel cell to said separator inlet.

4. The electrical power plant of claim 1, further comprising means for selectively preventing fluid communication from said second separator outlet to said separator inlet.

5. The electrical power plant of claim 1, wherein said separator comprises an anode, a cathode and a solid electrolyte.

6. The electrical power plant of claim 5, wherein said solid electrolyte is selected from the group consisting of a polymer, a fluoropolymer, a ceramic, and a metal oxide.

7. The electrical power plant of claim 5, wherein said separator further comprises a secondary electrical power source.

8. The electrical power plant of claim 1, further comprising a first flowpath from said first outlet of said fuel cell to said separator inlet, a second flowpath from said first separator outlet to said first reactant inlet, and a third flowpath from said second separator outlet back to said separator inlet, wherein said second and third flowpaths are different, and wherein said third flowpath bypasses said fuel cell.

9. The electrical power plant of claim 1, wherein said first reactant recycle system further comprises an accumulator disposed between said first outlet of said fuel cell and said separator.

10. The electrical power plant of claim 9, wherein said first reactant recycle system further comprises a first conduit extending from said first outlet of said fuel cell to said separator inlet, a second conduit extending from said second separator outlet and fluidly interconnectable with said first conduit, and a first valve disposed at a first intermediate location along said first conduit between said first outlet of said fuel cell and where said second conduit fluidly connects with said first conduit, wherein said accumulator is disposed at a second intermediate location along said first conduit.

11. The electrical power plant of claim 1, wherein said first reactant recycle system further comprises a pump fluidly interconnected with said second separator outlet, a first flowpath fluidly interconnectable with a discharge of said pump and extending to a second reactant inlet of said fuel cell, and a second flowpath fluidly interconnectable with said discharge of said pump and extending back to said separator inlet, wherein said second flowpath bypasses said fuel cell.

12. The electrical power plant of claim 11, wherein said first reactant recycle system further comprises means for selectively directing said discharge from said pump to one of said first and second flowpaths.

13. The electrical power plant of claim 1, wherein said fuel cell further comprises a second reactant inlet and a second outlet.

14. The electrical power plant of claim 13, further comprising a first reactant source fluidly interconnectable with said first reactant inlet, as well as a second reactant source fluidly interconnectable with said second reactant inlet.

15. The electrical power plant of claim 14, wherein said first reactant source comprises a fuel and said second reactant source comprises an oxidizer.

16. The electrical power plant of claim 13, wherein said electrical power plant further comprises a second reactant recycle system comprising a first recovery chamber and a second recovery chamber, wherein said second reactant recycle system is fluidly interconnectable with said second outlet of said fuel cell.

17. The electrical power plant of claim 16, wherein said first recovery chamber comprises a first chamber inlet, a first chamber gas outlet fluidly interconnectable with said second reactant inlet, and a first chamber liquid outlet, wherein second outlet of said fuel cell is fluidly interconnectable with said first chamber inlet.

18. The electrical power plant of claim 17, wherein said second recovery chamber comprises a second chamber inlet, a second chamber gas outlet fluidly interconnectable with said first chamber inlet, and a second chamber liquid outlet, wherein said first chamber liquid outlet is fluidly interconnectable with said second chamber inlet.

* * * * *